April 9, 1957  A. W. GARDES ET AL  2,788,126
CLARIFIER
Filed Sept. 15, 1953  3 Sheets-Sheet 1

Inventors
Alfred W. Gardes
Nicholas Dudchik

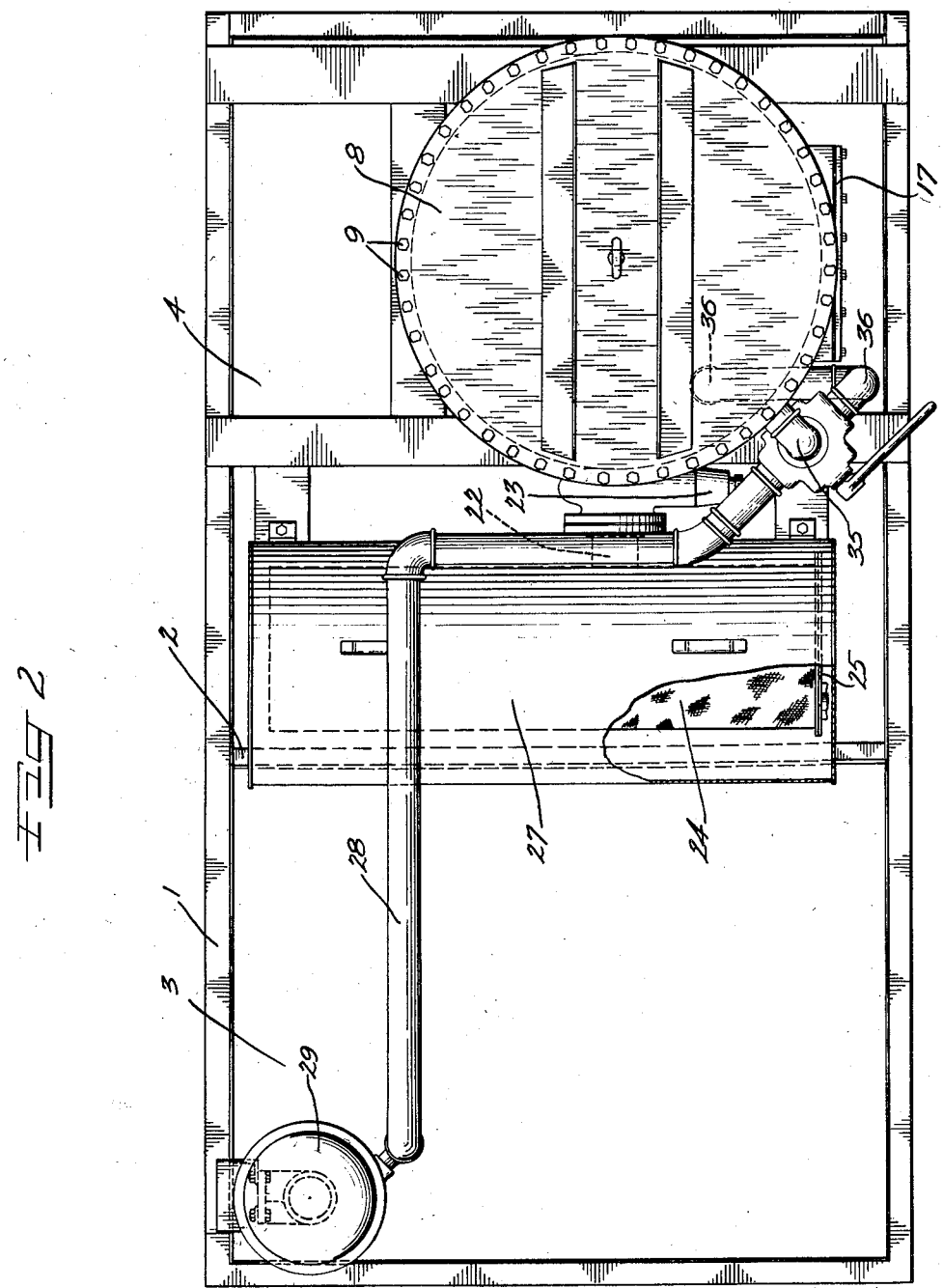

April 9, 1957  A. W. GARDES ET AL  2,788,126
CLARIFIER
Filed Sept. 15, 1953  3 Sheets-Sheet 3
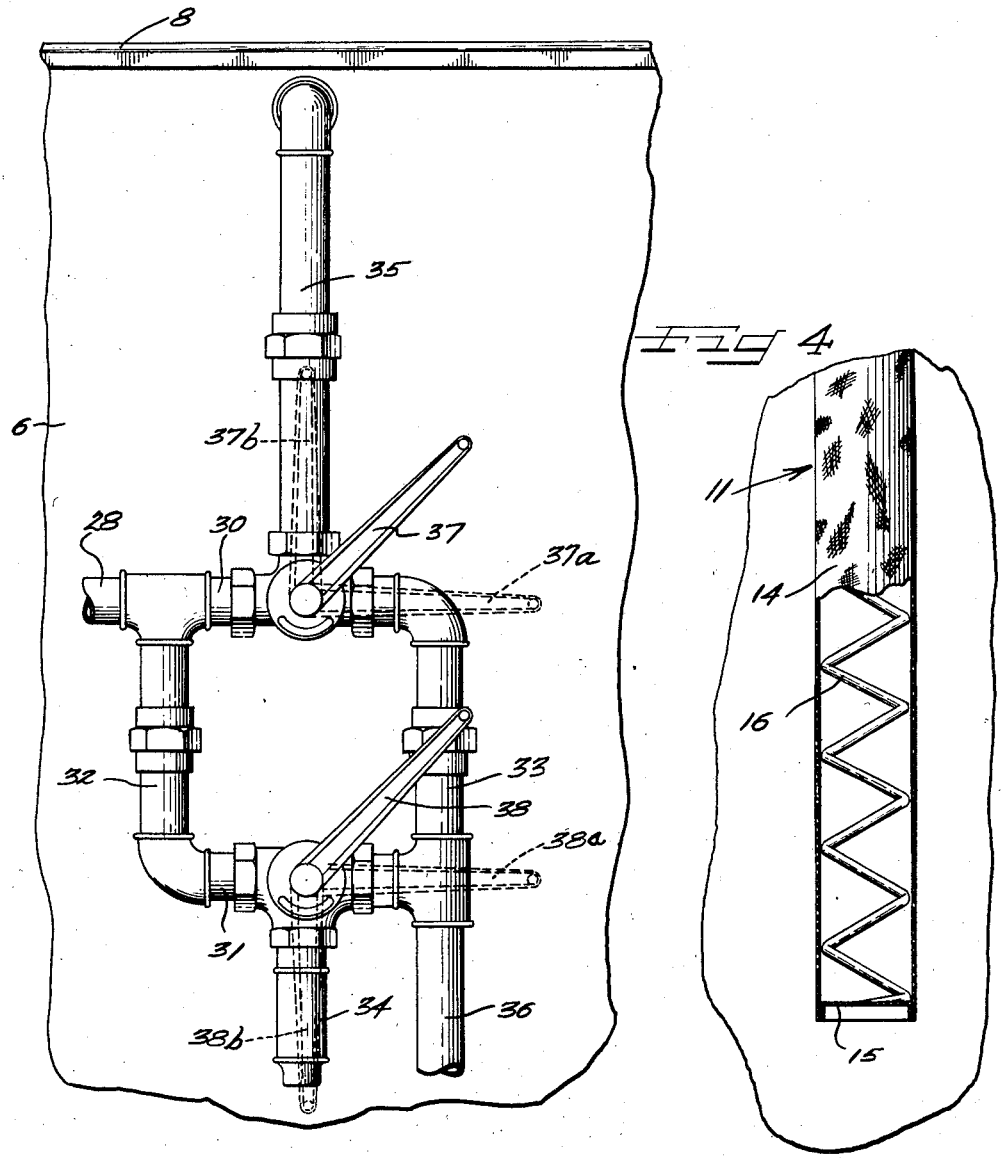
Inventors
Alfred W. Gardes
Nicholas Dudchik
By Kidd, Sherman, Norris, Gauss & Simpson  Attys United States Patent Office 2,788,126
Patented Apr. 9, 1957

2,788,126

CLARIFIER

Alfred W. Gardes, Detroit, Mich., and Nicholas Dudchik, Lebanon, Ind., assignors to Indiana Commercial Filters Corporation, a corporation of Indiana Application September 15, 1953, Serial No. 380,172

1 Claim. (Cl. 210—195)

This invention relates to improvements in a clarifier, and more particularly to a clarifying device highly desirable for the filtration and purification of water base or mineral oil coolants for the removal therefrom of chips, abrasives, dirt, and other solid contaminants, the clarifier being a part of a coolant circulatory system associated with one or more cutting or grinding machines and the like, although the clarifier may have other uses and purposes as will be apparent to one skilled in the art.

In the past, many and various types of coolant cleansing means have been developed, including some forms of filtration clarifiers. Many of these former known clarifiers, however, required precoating of the filter elements, the use of filter aids, or expendable filter media, and the system had to be shut down in order to effect cleansing of the filter elements. Further, formerly known clarifiers of this character were frequently not as compact as desired but required a considerable amount of flow space in order to furnish the desired capacity, and were not as unitary as desired. Also, clarifiers developed heretofore, were not as economical as desired, both as to manufacture thereof and as to operational cost.

With the foregoing in mind, it is an important object of the instant invention to provide a compact but high capacity clarifier, highly desirable for the economical filtration of metal working coolants, which is simple in construction and simple in operation.

Also an object of the invention is the provision of a compact clarifying assembly, which is unitary as to the clarifying element itself, the clean coolant and dirty coolant tanks associated with the element, and which occupies a minimum amount of floor space.

Also an object of the invention is the provision of a simple economical clarifier having a considerable filtering area by virtue of the use of many small diameter filtering tubes.

A further feature of the invention resides in the provision of a clarifier of the character set forth herein which eliminates all need for precoating, filter aids, or expendable filter media and which may be operated continuously or intermittently as desired.

Still a further object of the invention resides in the provision of a clarifier, highly suitable for cleansing metal working coolants, and which clarifier is easily self-cleaning in such a short time as not to interrupt the flow of clean coolant to the machines requiring the same.

Still another feature of the invention resides in the provision of a clarifier, highly desirable for cleansing metal working coolants which provides long continuous operation by virtue of its great filter area, which may be cleansed by the backwash method, and from which sediment is entrapped in a separate container rather than being discharged into the tank of contaminated coolant or other liquid.

It is also an object of the invention to provide a clarifier of the type set forth herein which is provided with efficient and quickly operable means for ridding the clarifier tank of any accumulated or hardened sludge of a character that would not ordinarily be removed by a backflow cleansing operation.

While some of the more salient features, characteristics and advantages of the instant invention have been above pointed out, others will become apparent from the following disclosures, taken in conjunction with the accompanying drawings, in which:

Figure 2 is a top plan view, with parts broken away, of the structure of Fig. 1;

Figure 3 is an enlarged fragmentary elevational view of a side portion of the clarifier tank, illustrating the valve control means; and Figure 4 is a fragmentary part sectional part elevational view of one of the filtering tubes utilized in the clarifier.

As shown on the drawings:

Figure 1:
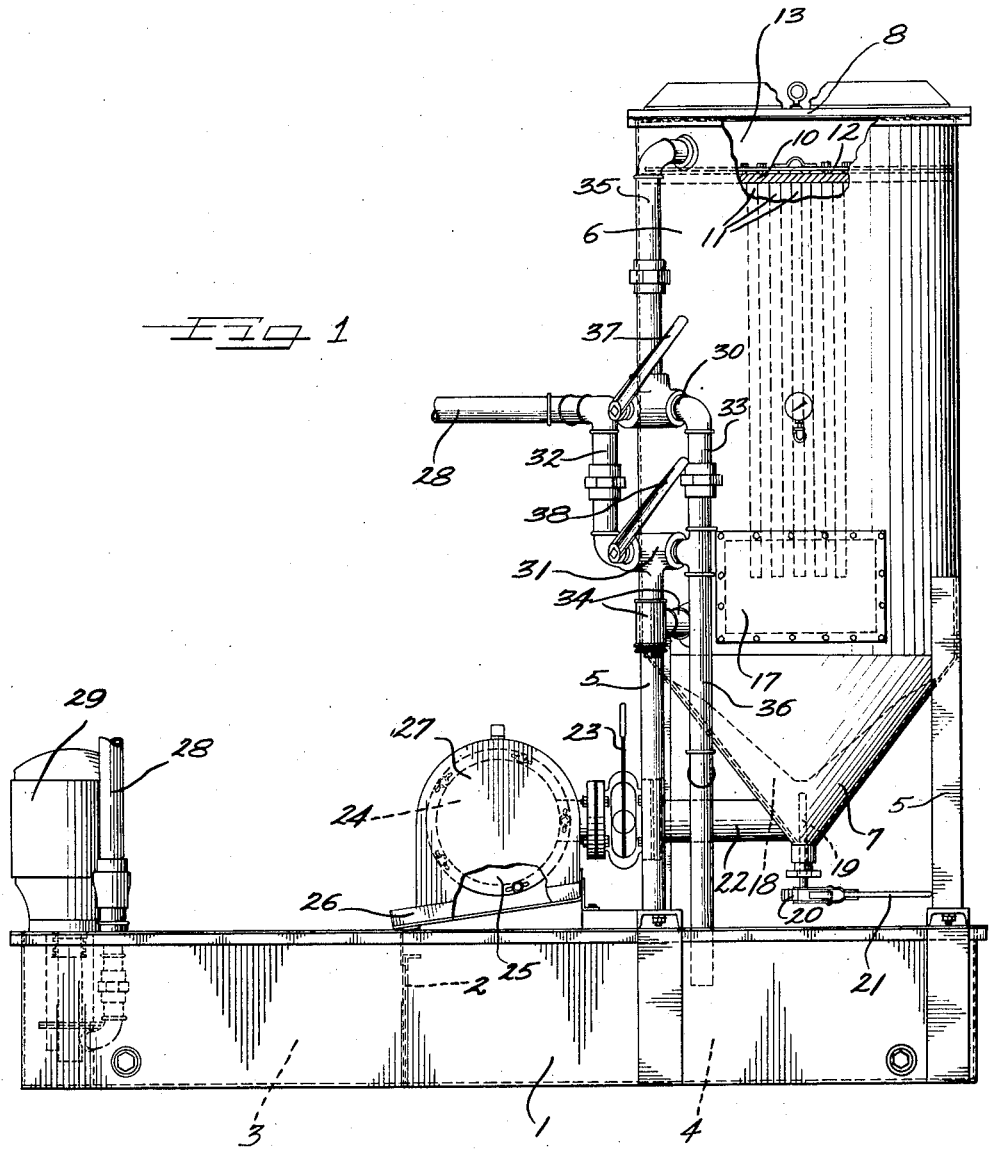
Figure 1 is a fragmentary side elevational view, with parts broken away, of a clarifier assembly embodying principles of the instant invention.

In the illustrated embodiment of the instant invention there is shown a floor tank 1 having a cross partition 2 therein in the form of a baffle or weir dividing the tank into separate compartments 3 and 4. The compartment or section 3 is for contaminated liquid, and the compartment or section 4 is for clarified or clean liquid. When the clarifier assembly is used for purifying coolant used with metal working machines, the contaminated coolant is fed from the machines into the tank section 3 by any suitable means, not illustrated, and clean coolant is returned to the machines from the tank section 4 by any suitable means, not illustrated.

Mounted above the tank on any suitable supports, as indicated at 5, is a clarifying tank or casing 6 preferably provided with a conical bottom portion 7. This tank is provided with a removable cover 8, bolted or equivalently secured to the flange at the top of the tank as indicated at 9.

Inside the tank near the top thereof is a retaining plate 10 forming a closed partition across the tank except for apertures in the plate through which numerous filter tubes 11 extend. An auxiliary hold-down plate 12 may be bolted to the plate 10 to maintain the filter tubes in proper position. The retainer plate 10 defines a filtrate chamber 13 thereabove into which filtrate may enter by passing upwardly out of the ends of the filter tubes.

Each of the filter tubes 11 is open at the top end, and with reference to Fig. 4 it will be seen that each tube is preferably of small diameter and comprises a body portion of finely woven screen 14, sealed at the bottom as indicated at 15. Inside the screen is a spiral spring-like element 16 to prevent the screen tube from collapsing due to liquid pressure inside the tank. These filter tubes 11 are expendable; that is, should one become worn out or damaged, it is discarded and a new one substituted, the filter tube structure being sufficiently economical to warrant that expedient, rather than endeavor to make repairs. The filter tubes may be removed by pulling them upwardly through the retainer plate 10, after removal of the cover 8. An inspection port normally kept closed by a removable cover 17 is disposed in a lower side portion of the tank where it is easily available.

The conical lower portion 7 of the tank is equipped inside with a rotary scraper comprising a plurality of blades 18 mounted on a shaft 19 and manually actuated by means of a pawl and ratchet mechanism 20 in turn operated by a handle 21. This scraper is utilized at rather remote intervals to loosen any contaminants that may have accumulated in this portion of the tank and which may have hardened or partially solidified to such an extent that it will not respond to backwashing of the filter elements.

A discharge pipe 22 extends laterally from the lower part of the conical portion 7 of the tank, passage of liquid through this pipe being controlled by a valve 23, and the pipe discharges into a sludge screen or basket 24 comprising a cylindrical screen, closed at one end, and having a removable cover 25 on the other end which may be taken off to scrape out sludge from the interior of the basket. This sludge screen is disposed above a discharge trough 26 leading into the contaminated liquid section 3 of the floor tank 1. Over the sludge basket or screen is a hood 27 which may be lifted off the trough 26 when the basket is cleansed.

The piping system for the clarifier assembly is so arranged as to be easily controlled. This system includes a pipe 28 from the contaminated liquid tank section 3 through which liquid may be urged by a pump 29. The pipe 28 leads to a square circuit including a top branch 30, a bottom branch 31, a left side branch 32, and a right side branch 33. An inlet pipe 34 connects with the bottom branch and leads into the clarifier tank 6. An outlet pipe 35 connects with the top branch 30 and communicates with the filtrate chamber 13 in the top of the tank 6. A pipe 36 leaves the lower right hand corner of the square arrangement and extends into the section 4 of the floor tank 1, which section is for the clarified liquid. A two way valve is located at the junction of the pipe 35 with the top branch 30 and is controlled by a handle 37. Similarly a two way valve is located at the junction of the inlet pipe 34 with the bottom branch 31 and is controlled by a handle 38.

Now, in operation, assuming that coolant is being clarified by the assembly, the valve handles 37 and 38 are moved to horizontal position as indicated by the dotted showing in Fig. 3, 37a and 38a, respectively. This establishes communication between the outlet pipe 35, the right side of the branch 33, and the pipe 36. By way of a valve handle 38, communication is established through the pipe 28, the left side branch 32, and the inlet pipe 34. Liquid is then pumped through the pipe 28, the left side branch 32, a part of a bottom branch 31, the inlet pipe 34 into the interior of the clarifier under pressure developed by the pump 29, this liquid coming from the contaminated liquid section 3 of the floor tank 1. Inside the tank 6, liquid passes radially through the various filter tubes 11, and exits axially through those tubes in a purified condition into the filtrate chamber 13 above the retainer plate 10. The filtrate flows out of the chamber 13 through the outlet pipe 35, the right hand portion of the top branch 30, the right side branch 33, and the pipe 36 into the cleaned coolant section 4 of the floor tank, from which it is redistributed to the machines. After a relatively long period of time, frequently an eight hour run, it is desirable to backwash the filter elements. When this is to be done, the handle 38 is moved to the full line position seen in Fig. 3, that is the 45° angle position, and the handle 37 is raised to vertical position 37b. Movement of the handle 38 cuts off any communication with the inlet pipe 34. Movement of the handle 37 establishes communication between the pipe 28 and the outlet pipe 35 and cuts off all other communication. Liquid is then pumped through the pipe 28, the outlet pipe 35, into the filtrate chamber 13, and reversely through the filter tubes 11, washing off the accumulated contaminants on the external surface of these tubes, and these contaminants flow out from the bottom of the conical section 7 of the tank through the pipe 22, the valve 23 having been opened. Should any of the contaminants accumulate on the conical portion 7 of the tank or harden thereon sufficiently to resist the liquid flowing reversely through the tank, these contaminants may be loosened by manual actuation of the scraper 18 by way of the handle 21, and these contaminants will also flow out the pipe 22 along with the liquid and be discharged into the sludge basket 24, where they will be retained, while the liquid itself free of the contaminants will flow over the trough 26 into the contaminated liquid tank section 3.

It is not objectionable that the backwashing is accomplished by liquid from the contaminated liquid section 3 of the floor tank. Usually the backwashing operation is done when the machines are idle and at that time all of the liquid in both sections of the tank 1 is in a substantially clean condition. This is because the clarifying assembly handles considerably more liquid than is necessary to supply the machines, so that cleansed liquid is almost constantly flowing over the weir 2 into the contaminated section.

The connection of the bottom branch 31 of the square piping arrangement with the pipe 36 is merely an expedient for use only in an emergency, such as the entire clarifier being out of order. That will probably never happen, but a safety feature is provided in that when the valve handle 38 is moved to downward position 38b and valve handle 37 is moved to the oblique full line position of Fig. 3, contaminated liquid may be pumped directly from the tank section 3 into the tank section 4 so that the machines will be supplied with some coolant.

From the foregoing, it is apparent that we have provided a simplified clarifier assembly, highly economical to produce and operate, which may be readily cleansed for further usage, which is long lived and highly durable, which occupies a minimum amount of floor space, and which utilizes filter elements sufficiently economical to be expendable so as to avoid repair work.

It will be understood that modifications and variations may be effected without departing from the scope of the novel concepts of the present invention.

We claim as our invention:

In a clarifier assembly, a floor tank divided into a clean liquid section and a contaminated liquid section, a clarifier tank mounted above said floor tank, filter means in the clarifier tank, an inlet pipe connected with said clarifier tank at a lower portion thereof, means for pumping contaminated liquid from said contaminated liquid section through said inlet pipe into said clarifier tank, an outlet pipe for filtrate leading from the clarifier tank adjacent the top portion thereof to said clean liquid section of the floor tank, valve means to cut off the inlet pipe and connect the outlet pipe with the pumping means to backwash the filter means, valve controlled outlet means at the bottom of said clarifier tank for backwash liquid and contaminants, a sludge basket into which the last said outlet means discharge, said sludge basket being perforate, and a drain trough beneath the sludge basket leading to the contaminated liquid section of the floor tank.

References Cited in the file of this patent

UNITED STATES PATENTS

| Number | Name | Date |
|---|---|---|
| 420,136 | Willis | Jan. 28, 1890 |
| 1,056,928 | Morris | Mar. 25, 1913 |
| 1,402,706 | Auberschek | Jan. 3, 1922 |
| 1,757,554 | Auberschek | May 6, 1930 |
| 1,812,773 | Cannon | June 30, 1931 |
| 1,855,610 | Robinson | Apr. 26, 1932 |
| 1,870,381 | Piper | Aug. 9, 1932 |
| 1,994,372 | Smith | Mar. 12, 1935 |
| 2,013,776 | Weisman | Sept. 10, 1935 |
| 2,301,430 | Malanowski | Nov. 10, 1942 |
| 2,347,927 | Paterson et al. | May 2, 1944 |
| 2,523,793 | Vance | Sept. 26, 1950 |
| 2,547,277 | Marsh et al. | Apr. 3, 1951 |
| 2,549,063 | De Haven | Apr. 17, 1951 |
| 2,570,131 | Koupal | Oct. 2, 1951 |
| 2,601,156 | Lax | June 17, 1952 |
| 2,615,456 | Galusha | Oct. 28, 1952 |
| 2,693,882 | Olson et al. | Nov. 9, 1954 |

FOREIGN PATENTS

| Number | Country | Date |
|---|---|---|
| 244,339 | Switzerland | Apr. 1, 1947 |